W. M. ISMOND.
CLOTHES DRIER.
APPLICATION FILED MAY 29, 1913.
1,100,882.
Patented June 23, 1914.
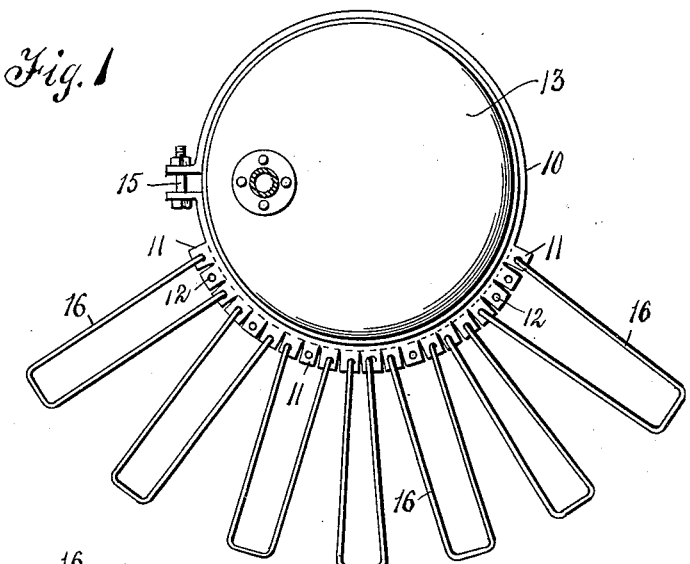
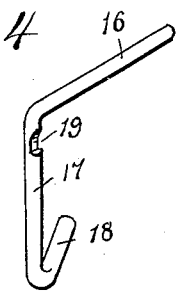
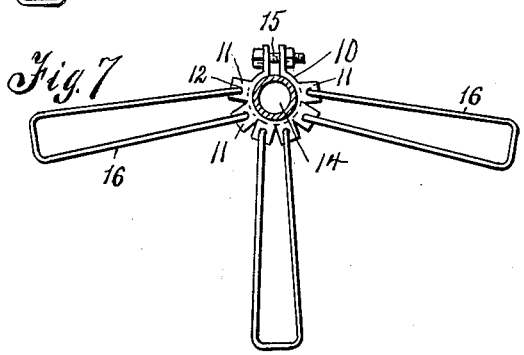
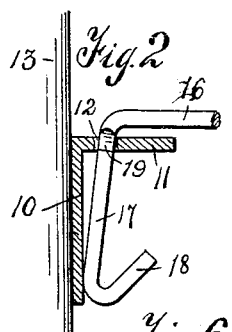
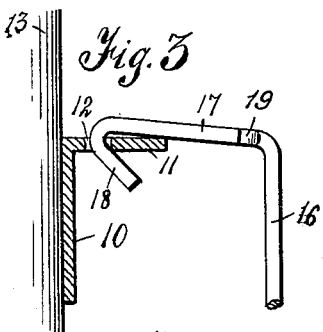
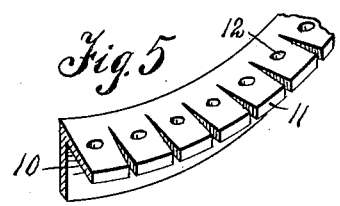
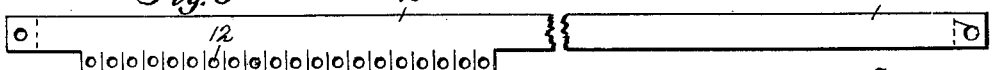
Witnesses
Inventor
W. M. Ismond,
By
Attorneys.

UNITED STATES PATENT OFFICE.

WILLIAM M. ISMOND, OF TORONTO, ONTARIO, CANADA.

CLOTHES-DRIER.

1,100,882.  Specification of Letters Patent.  Patented June 23, 1914.

Application filed May 29, 1913. Serial No. 770,704.

*To all whom it may concern:*

Be it known that I, WILLIAM M. ISMOND, subject of the King of Great Britain, residing at Toronto, Province of Ontario, Dominion of Canada, have invented certain new and useful Improvements in Clothes-Driers; of which the following is a specification.

This invention relates to improvements in clothes racks, more particularly to the class of racks adapted to be supported upon hot water heaters, stove pipes, heating pipes, or like devices, and has for one of its objects to simplify and improve the construction and increase the efficiency and utility of devices of this character.

Another object of the invention is to provide a simply constructed device which may be increased or decreased in size to adapt it to different sized boilers, pipes, or other supporting structures.

Another object of the invention is to provide a simply constructed device which may be quickly applied to or removed from its support and in which the members are foldable to occupy less space when not in use.

With these and other objects in view the invention consists in certain novel features of construction as hereinafter shown and described and then specifically pointed out in the claims.

The improved device may be readily adapted for connection to supporting structures of various kinds, such as the hot water heating tanks employed in connection with cooking ranges for heating water for bath rooms, and for like purposes, or which may be readily applied to hot water pipes or other stationary structures, but for the purpose of illustration the improved device is shown connected to a conventional hot water heating tank and likewise applied to an ordinary hot water pipe.

In the drawings illustrative of the preferred embodiment of the invention, Figure 1 is a plan view of a conventional hot water tank with the improvement applied. Fig. 2 is an enlarged sectional detail illustrating the arrangement of the rack bars in open or operative position. Fig. 3 is a view similar to Fig. 2 showing the rack bar arranged in depressed or inoperative position. Fig. 4 is an enlarged perspective view of a portion of one of the rack bars illustrating the arrangement of the holding notches. Fig. 5 is a perspective view of a portion of the supporting band. Fig. 6 is a plan view of the supporting band before being bent into shape. Fig. 7 is a view similar to Fig. 1 illustrating the manner of applying the improved device to a pipe. Fig. 8 is a view similar to Fig. 7 illustrating a slight modification of the supporting band.

Corresponding and like parts are referred to in the following description and indicated in all the views of the drawings by the same reference characters.

The improved device comprises a strip of metal represented conventionally at 10 and with apertures in the ends and enlarged laterally intermediate the ends, the enlargement being divided by clefts into a plurality of tongues 11, each tongue being provided with an aperture 12. The enlargement is designed to be bent at right angles to the body of the strip, as represented in Fig. 5, and then when the strip is bent around the supporting structure, such as a hot water tank 13, or a pipe 14, as the case may be, the tongues 11 will stand outwardly away from the body 10, as shown, and slightly separated at their outer ends. The perforated terminals of the strip 10 are bent at right angles to receive a binding bolt 15 by which the band is firmly coupled around the supporting structure 13 or 14, the only difference being that the band is longer when employed upon the structure 13 and contains a greater number of the tongues 11 than when employed upon the structure 14. Generally the tongues 11 will be sufficient to embrace about one third of the circumference of the supporting body, but may be increased or decreased as preferred.

When employed upon the pipe 14 the band will contain a lesser number of the tongues, for instance six as shown in Fig. 7, but it will be understood that the invention is not limited in any manner to the number of tongues employed upon the bands. By this arrangement the band 10 with its lateral offset whereby the tongues are produced can be manufactured and shipped knocked down or in flat form and thus occupy comparatively small space and can be readily bent around the supporting structure and secured in place by any person without previous skill or knowledge and readily adapted to the size of the structure to which it is to be adapted without material change in the band other than in increasing or decreasing its length.

The rack bars for supporting the garments are each formed of a rod bent into U shape whereby spaced sides are produced and spaced apart a distance preferably corresponding to the distance between each alternate tongue or the opening therefor, as represented in Fig. 1.

Each of the sides 16 is bent downwardly at its end for a distance, as represented at 17, and the terminal of the bent portion 17 again bent into a hook-like form, as represented at 18, the portions 17—18 engaging through the apertures 12 of the tongues 11, as represented in Figs. 2 and 3. The outer sides of each of the downwardly bent portions 17 is likewise provided with a notch 19 adapted to engage against the edge of the aperture 12 when the rack bars are inserted, as represented in Fig. 2. The member 16 is formed from resilient metal and may thus be spread apart so that they require some force to insert them through the apertures. Consequently, when the pressure is removed the resiliency of the bars will cause them to move away from each other and thus cause the notches 19 to constantly engage against the adjacent portion of the apertures 12 and retain the bars in position and prevent their accidental displacement, while at the same time the bars can be readily removed by compressing them slightly to release the notches from engagement with the tongues. When arranged for use the bars will be elevated until the notches 19 engage with the edge of the apertures 12 and the bend of the hooked terminal 18 bears against the band below the tongues, as shown. The U-shaped rack bars are thus retained substantially in horizontal position and will remain in this position until manually released. When it is desired to fold the rack bars into inoperative position the sides 16 will slightly compress to release the notches 19 and the portions 17 drawn upwardly and the outer portion 16 turned downwardly and the hooked terminals 18 assume the position shown in Fig. 3. The rack bars will thus be retained in downwardly directed position in substantial alinement with the supporting structure, while at the same time the bars can be readily removed by an upward movement to release the hooks 18.

The band 10 and its integral tongues 11 are formed from a single strip of metal, preferably steel, of sufficient strength to withstand the strains to which it will be subjected when in use, while the rack bars 16 will likewise be of metal, preferably steel, and of sufficient size to support the garments. The band 10 including the tongues 11 may be galvanized or otherwise treated to prevent corrosion, while the rack bars may also be galvanized or otherwise treated for the same purpose.

If preferred every alternate tongue 11 may be removed, as shown in Fig. 8, but this would not constitute a departure from the spirit of the invention or sacrifice any of its advantages.

The improved device is simple in construction, can be inexpensively manufactured and applied, and will be found very convenient for the purposes described.

Having thus described the invention, what is claimed as new is:

1. A device of the class described comprising a support having a plurality of apertures spaced apart, a rack member of resilient material in U-shape with the terminals directed substantially at right angles to the side portions thereof and with notches in the right-angled portions, said right-angled portions operating through the apertures with the notches engaging the edges of the same and retained in position by the resiliency of the material of the rack.

2. A device of the class described comprising a support of relatively thin material and having a plurality of apertures spaced apart, a rack member of resilient material in U-shape with the terminals directed substantially at right angles to the side portions thereof and with notches in the right-angled portions and the extremities of the right-angled portions directed obliquely to the right-angled portions, said right-angled portions operating through the apertures with the notches engaging the edges of the same and the obliquely directed terminals preventing the complete displacement of the rack members.

3. In a device of the class described, a band adapted to be attached to a support and formed with a right-angularly directed portion having perforations spaced apart, a rack member of resilient material U-shaped with the terminals directed substantially at right angles to the side portions thereof and with notches in the right-angled portions, said right-angled portions operating through the apertures with the notches engaging the edges of the same and retained in position by the resiliency of the material of the rack.

4. A device of the class described including an outwardly directed member having perforations spaced apart, a rack member of resilient material including downwardly directed terminals each engaging through one of the perforations and with notches in the sides of the downwardly directed portions to engage the sides of the apertures and yieldably retained in position by the resiliency of the rack.

In testimony whereof I affix my signature in presence of two witnesses.

WILLIAM M. ISMOND. [L. S.]

Witnesses:
D. S. TOVELL,
R. S. CHILTON.

Copies of this patent may be obtained for five cents each, by addressing the "Commissioner of Patents, Washington, D. C."